Nov. 12, 1968
L. PAQUIN
3,410,326
MULTI-PURPOSE LATHE
Filed Aug. 19, 1966
2 Sheets-Sheet 1
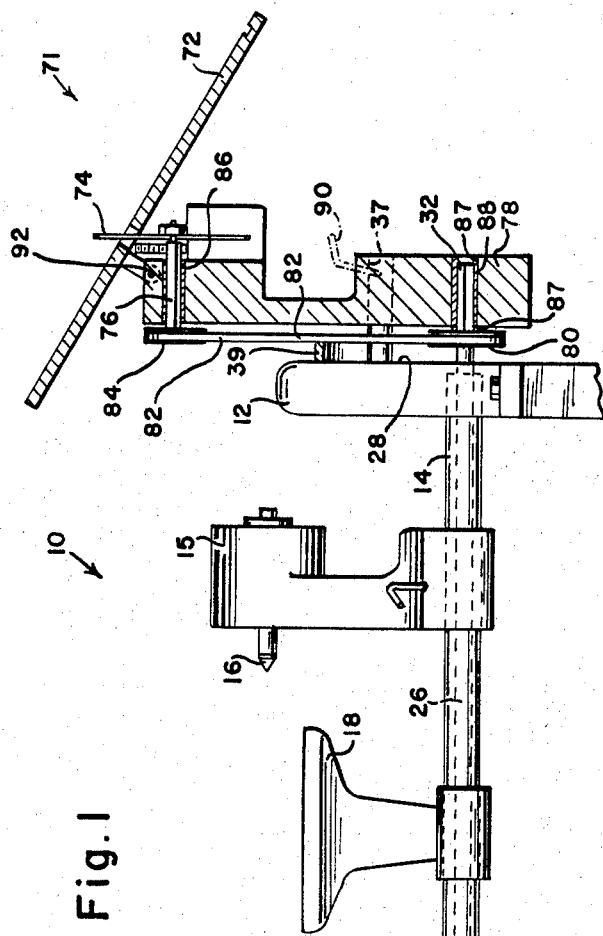
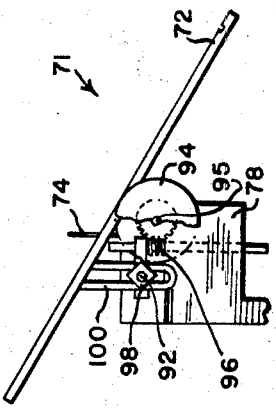
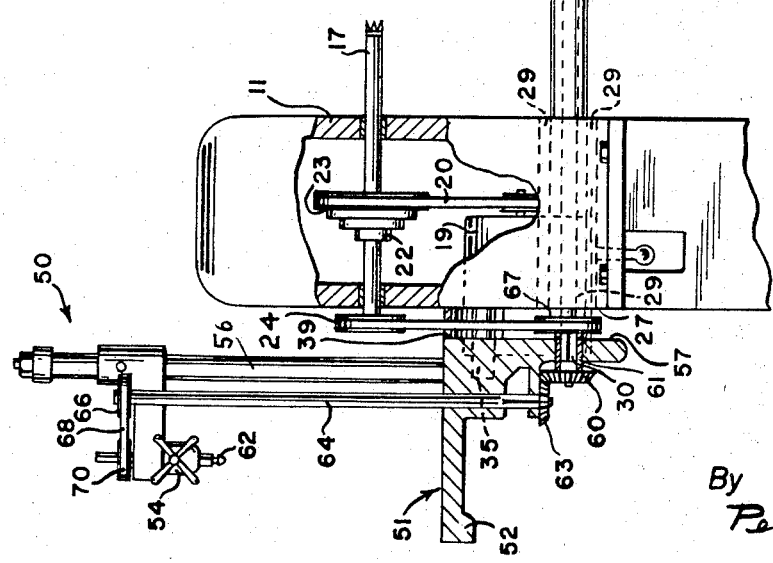
INVENTOR
Lionil Paquin
By *Pearson + Pearson*
ATTORNEYS

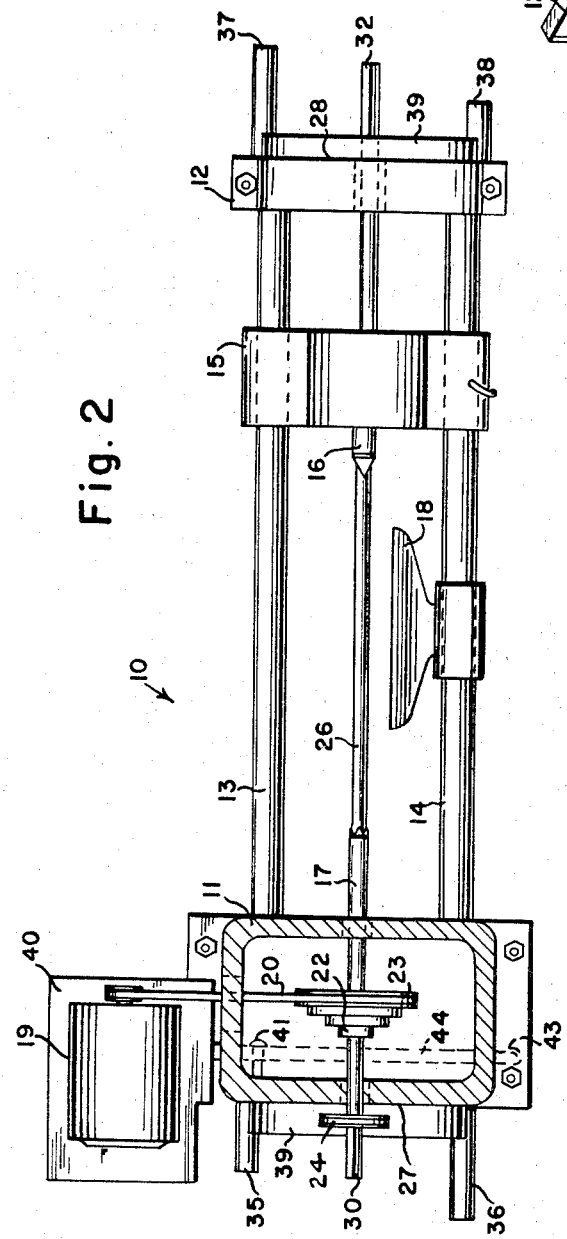
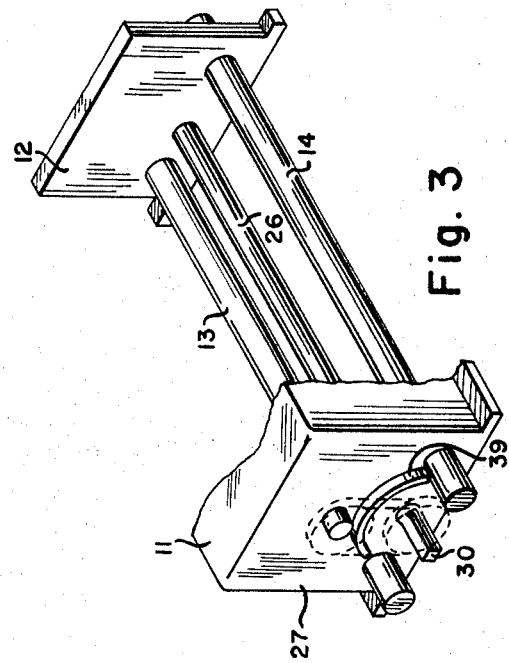
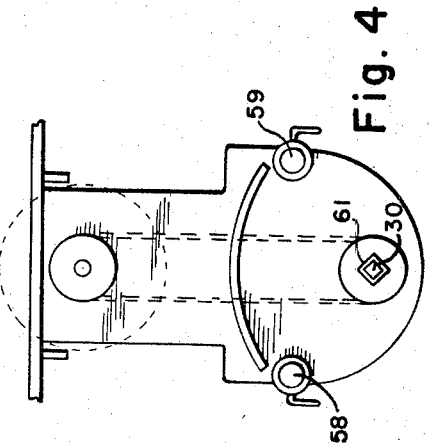

United States Patent Office 3,410,326
Patented Nov. 12, 1968

3,410,326
MULTI-PURPOSE LATHE
Lionil Paquin, 71 Chandler St., Nashua, N.H. 03060
Filed Aug. 19, 1966, Ser. No. 573,646
8 Claims. (Cl. 144—1)

This invention relates to a multi-purpose lathe tool assembly, especially for home workshop woodworking, and conveniently convertible to perform any of a large number of operations such as abrading, shaping, drilling, and the like. The convenience and adaptability of the apparatus of the invention is assignable at least in large part, to the provision of an upstanding tail piece and a secondary operating shaft extending the full length of the lathe bed, at bed level, either projecting end of which may be utilized for connection to one of a plurality of tools. A plurality of attachable and detachable tools, each including work-positioning and power-connection means are provided to drivingly cooperate with the secondary operating shaft in facilitating use of the apparatus.

In smaller industrial operations and in home workshops, there has long been a need for a low cost, rugged lathe to which additional tools may be affixed for performing a large number of operations. It is desirable that the versatility of the tool be maximized while its cost and the difficulty of converting it from performance of one operation to performance of another operation be minimized. It is most desirable that this versatility be achieved with no increase in hazard to the operator of the apparatus, with a minimum increase in space required for the installation of the apparatus, and with little or no loss in the fundamental utility of the apparatus for conventional lathe operations.

Multi-purpose lathes have heretofore been proposed usually consisting of a built-in motor within, or forming, the headstock, the inside of the motor shaft forming the lathe spindle, and the outside of the motor shaft being arranged to carry, or drive, another tool at the headstock end of the lathe. For example, in U.S. Patent 1,726,702, to Heston of Sept. 3, 1929, U.S. Patent 2,071,201 to Frech of Feb. 16, 1937, and U.S. Patent 3,103,058 to McElroy of Sept. 10, 1963, the electric motor forming the headstock drives a disc saw or abrasive wheel on the end of the motor shaft carrying the lathe spindle. In U.S. Patent 2,619,135, to Callaway of Nov. 25, 1952, the spindle shaft is adapted to drive a variety of tools on the outer end while the electric motor is under the lathe bed and connected to the spindle shaft by a belt drive.

In this invention, both ends of the lathe are made available to receive and drive other tools, without obstructing the work area of the lathe above the lathe bed with power transmission mechanism. By providing a full length shaft within, and at the level of the lathe bed, driving the shaft from the outer end of the headstock spindle and driving the spindle from a motor pivotally mounted alongside the lathe bed, one tool can be mounted at the headstock end and another tool mounted at the tail piece end of the lathe.

The principal object of the invention is to provide a low cost, basic wood turning lathe, having a novel power train structure which permits the lathe motor to drive one of the plurality of other tools at the headstock end and another such tool at the tail piece end of the lathe without obstructing the working space above the lathe bed.

Another object of the invention is to provide novel slidable clamping means on the vertical outside face of both the headstock and tail piece of a lathe which permits extra tools to be supported and driven at either, or both, lathe ends while cantilevered to avoid becoming fouled with refuse, chips, waste, cuttings, etc.

A further object of the invention is to provide a multi-purpose lathe, having a plurality of tool attachments mountable at either end thereof, the lathe bed consisting of a pair of cylindrical rails upon which the major parts are sleeved, whereby the assembly can be shipped in unassembled condition in a compact package and the tool rest can slide on either rail for working on either side of the lathe.

A further object of the invention is to provide a lathe, with drive means and attachment mounting means at each opposite end, there being a set of rotating cutter, drill, and abrading tools attachable on the higher, headstock end, and a set of tilt-table type tools on the lower, tail piece end, the latter end providing more working space for such tools.

Still another object of the invention is to provide a lathe with a double-ended secondary driveshaft within, and at the level of the lathe bed, and a plurality of tools, each attachable on one end or the other of the lathe, the drive connection of each tool with the adjacent squared shaft end being hooded by an arcuate rib on the outside of the headstock or tail piece to protect it from cutting chips from the tool.

In this application and accompanying drawings a preferred embodiment of the invention has been shown and described and various alternatives and modifications have been suggested thereof, but it is to be understood that other changes and modifications can be made within the scope of the invention. The suggestions herein are selected and included for purposes of illustration in order that others skilled in the art will more fully understand the invention and the principles thereof and will be enabled to modify it and embody it in a variety of forms, each as may be best suited to the condition of a particular case.

FIGURE 1 is a side elevation, partly in section, of a multi-purpose lathe constructed in accordance with the invention.

FIGURE 2 is a plan view of the lathe shown in FIGURE 1, partly in section.

FIGURE 3 is a perspective view of an embodiment of the invention in which the terminal ends of the rails form the pins for attaching other tools.

FIGURE 4 is an end elevation of a typical woodworking tool attachment, showing the pin recesses and squared socket, and FIGURE 5 is a view in elevation of the tiltable saw table attachable to the lathe shown in FIGURE 1.

Referring now to the drawings, it is seen that lathe 10 includes the upstanding headstock 11, upstanding tail piece 12, and a pair of cylindrical parallel rails, or rods, 13 and 14, the ends of the rods being received in cylindrical recesses in the headstock and tail piece to connect the same, and the rods serving as a lathe bed. The rods may be welded or otherwise permanently fixed in position, or may be detachable for shipment and clamped, bolted, or otherwise fixed during assembly. A tailstock 15 is movably mounted on the rails and clampable in a conventional manner, the tailstock centre 16 being aligned with the spindle centre or shaft 17 of the headstock at a predetermined level above the level of the lathe bed. A tool rest 18 is also slidable and clampable on either rail 13 or 14. For convenience, I call headstock shaft 17, the primary shaft.

Primary shaft 17 is journalled in headstock 11, and driven by an electric motor 19, through belt 20, there being a grab type clutch 22 fast to shaft 17, and a three step pulley 23 arranged to be engaged by the clutch. Also drivingly connected to motor 19 through spindle shaft 17 and drive belt 24 is the longitudinally extending, secondary drive shaft 26. This shaft 26 rotates in suitable bearings 29, and runs the full length of lathe 10 within, parallel to, and at the level of, rails 13 and 14, terminating in squared shaft end 30 at, and projecting beyond, the outer side face 27 of headstock 14 and in squared shaft end 32, projecting beyond, outer face 28 of tail piece 12, at the opposite end of the lathe from headstock 14. These squared terminal ends, 30 and 32, form power connections for supplemental woodworking operations.

In addition to ends 32 and 30 of shaft 26, a pair of longitudinally extending pins 35 and 36 project outwardly from headstock face 27 of lathe 10, and an identical pair of pins 37 and 38 project outwardly from tail piece face 28, the pins being parallel to the ends 30 and 32 and laterally spaced therefrom. One pin, 36 and 37, of each pair is longer than the other pin of the pair to facilitate alignment of tool brackets thereon. An arcuate spacer rib 39 partially encircles each of shaft ends 30 and 32, and the space occupied by the pulleys or gears mounted thereon. These spacer ribs 39, provide protection for the squared ends 30 and 32 of secondary shaft 26, and the drive connections, against such foreign material as sawdust, etc. Spacer ribs 39 also provide means for protecting ends 30 and 32 of shaft 26 against mechanical abuse.

Motor 19 is pivotally mounted on motor table 40 (best shown in FIGURE 2) to provide easy tension adjustment and for change of drive belt 20 to any of the sheaves of three-step pulley 23. Table 40 is pivotally mounted at pivot pin 41 and is operated by means of the handle 43 of operating arm 44.

Pins 35, 36, 37 and 38 and protruding shaft ends 30 and 32 of the secondary drive shaft 26 form mounting means at each end of lathe 10 for quick-detachable mounting and driving of any one of twelve woodworking tools, two of which are illustrated in the drawings.

At the headstock end of the lathe 10 is illustrated a detachable drill press assembly 50 comprising bracket 51 including a work table 52, a drill press 54, and column 56 on which drill press 54 is vertically slidable. Extending downwardly from bracket 52 is a vertical leg 57 having positioning, laterally spaced, cylindrical apertures 58 and 59 for receiving pins 35 and 36 and a bevel gear 60 having a squared socket shank 61, into which squared end 30 fits, for driving drill 62 through bevel gear 63, vertical drive shaft 64, pulley 66, belt 68 and pulley 70. Note that bracket 51 is spaced away from headstock 11 by means of arcuate rib 39. The rib 39 covers the pulley 67 by which shaft 26 is driven and the bracket 51 covers the bevel gears 60, 63, squared shaft end 30, and gear shank 61, so that drill particles, or the chips from other similar tools, will not foul the moving parts of the power connection.

Other tools which include brackets similar to bracket 51, apertures 58 and 59 and squared hollow shank drive elements similar to 61 and which are preferably mounted on the headstock end of the lathe, are a disc type circular saw, molding or shaping tool, grinding tool, jigsaw and band saw.

At the other, or tail piece end of the lathe, other tools may be mounted, such as a planing, or milling, cutter, belt, or roll, sander, or tilt table circular saw. The brackets of each tool are slidable longitudinally onto the pins and quickly attachable and detachable with relation to the squared shaft ends 30 and 32 in a manner which will be obvious, and these tools are not, therefore, illustrated.

There is illustrated, at the tail piece end of lathe 10, one of these quick detachable tools which usually require considerable working space, namely the bench saw 71, having a tilt table 72 and a fixed axis disc saw 74 rotatably mounted on an operating shaft 76 and including the bracket 78 attachable in the same manner as the leg 57 of bracket 51.

Shaft 76 is operated through pulley 80, belt 82 and pulley 84, which latter pulley is rotatably mounted in bearing 86 in bracket 78. Pins 37 and 38 are received in spaced apertures in bracket 78. Squared segment 32 of shaft 26 fits into the squared socket 87 of the shank 88 of pulley 84 to provide means to drive saw 74.

Screw tightening means 90 is provided for clamping the bracket 78 securely onto the pins 38 and 39. Saw table 72 is pivotally mounted on pivot pins 92, and the incline, or tilt, is adjustable by turning knob 94 to turn operating shaft 95 and worm gear assembly 96.

Set screw means 98 is mounted for slidable movement in the slotted arm 100 to provide means for holding table 72 in desired angular position.

On reading the instant specification, those skilled in the art will readily visualize various ways for obtaining advantages from the versatile nature of the apparatus of the instant invention. A particularly useful combination found by applicant to be advantageous is to utilize one end of the secondary tool shaft to drive a disc saw, molding tool, grinder tool, jigsaw, band saw and drill press while using the other end of the secondary tool shaft to drive tools operated in conjunction with the table attachment, for example, such tools as a plane miller, a band sander and a belt sander.

What is claimed is:

1. A multi-purpose lathe comprising
   a longitudinally extending frame having a headstock fixed to, and upstanding from one end, a tail piece fixed to and upstanding from the other end, a tail stock longitudinally slidable on said frame between said headstock and tail piece, the spindle of said headstock and the centre of said tail stock being aligned with each other, parallel to, and above, said frame,
   an electric motor mounted alongside said frame, the shaft thereof being parallel to and spaced from said spindle and drivingly connected thereto by belt and pulley means,
   a double ended drive shaft extending longitudinally of said frame and rotatably mounted in said headstock and tail piece, one terminal end of said shaft projecting beyond the outside of said headstock, and the other terminal end of said shaft projecting beyond the outside of said tail piece,
   power train means, including a clutch, drivingly connecting said spindle to said drive shaft for rotating the same,
   a plurality of longitudinally extending pins on the outside of said headstock and tail piece, parallel to the terminal ends of said drive shaft, and
   a plurality of wood working tool attachments, each having apertures for receiving said pins and drive elements socketed to receive, and be driven by, a terminal end of said shaft,
   whereby said lathe is useable for lathing or for driving one of said tool attachments at the headstock end or for driving one of said tool attachments at the tail piece end.

2. A multi-purpose lathe as specified in claim 1, wherein
   said frame comprises a pair of cylindrical rails, and said headstock and tail piece each include a pair of cylindrical recesses receiving one of the opposite ends of said rails, said recesses being at the level of, and each on an opposite side of said drive shaft.

3. A multi-purpose lathe as specified in claim 1, wherein
   each drive element of each said woodworking tool attachment includes a shank with a squared socket and,
   each opposite terminal end of said drive shaft is squared to slidably fit any one of said squared sockets to rotate the drive element thereof.

4. A multi-purpose lathe as specified in claim 1 wherein one said pin of said plurality of pins on the outside of said headstock and tail piece is longer than the other pins for guiding a tool attachment onto said pins.

5. A multi-purpose lathe as specified in claim 1 plus an arm pivoted to said headstock, said arm supporting said motor on one end thereof at one side of said lathe and having a handle at the other end thereof on the other side of said lathe, whereby the weight of said motor provides uniform tension on said belt and pulley drive means and said arm may be pivoted to facilitate belt shifting.

6. A multi-purpose lathe as specified in claim 1, plus a pair of integral, arcuate, spacer ribs, one on the outside of said headstock and the other on the outside of said tail piece, each said rib partially encircling and covering the adjacent terminal end of said drive shaft and the woodworking attachment drive element mounted thereon.

7. In combination with a lathe a drive shaft extending longitudinally through the lathe bed, one terminal shaft end projecting beyond one end of said bed and the other terminal shaft end projecting beyond the other end of said bed, means for driving said shaft from the drive spindle of said lathe, a plurality of tool attachments each having a bracket, quick detachable mounting means at each end of said bed for supporting one of said brackets, and quick detachable power connection means on each said bracket adapted to engage the adjacent end of said shaft for driving the tool on said bracket.

8. In combination with a woodworking lathe having a lathe frame, a headstock and a movable tail stock, a tail piece upstanding from said frame at the end opposite said head stock, a shaft extending longitudinally of said lathe, at the level of said frame, said shaft being journalled in said headstock and tail piece and having one terminal end projecting beyond said headstock and an opposite terminal and projecting beyond said tail piece, a plurality of woodworking tools of various types each having an identical bracket containing a rotatable drive element, socketed to be drivingly engaged by either terminal end of said shaft, and quick detachable mounting means on said headstock and tail piece and on each said bracket for selectively supporting any one of said brackets on either end of said lathe in drive connection with said shaft.

References Cited
UNITED STATES PATENTS

| | | | |
|---|---|---|---|
| 1,999,625 | 4/1935 | Cammack | 144—1 X |
| 2,517,608 | 8/1950 | Taylor | 144—1 X |
| 2,662,566 | 12/1953 | Kurschner. | |
| 3,299,918 | 1/1967 | Howey | 144—1 |

WILLIAM S. LAWSON, *Primary Examiner.*